United States Patent [19]

Theysohn et al.

[11] 4,287,117

[45] Sep. 1, 1981

[54] PREPARATION OF FINELY DIVIDED POLYOLEFIN MOLDING MATERIALS CONTAINING CONDUCTIVE CARBON BLACK, AND THEIR USE FOR THE PRODUCTION OF MOLDINGS

[75] Inventors: Rainer Theysohn, Ludwigshafen; Gerhard Zeitler, Hessheim; Frank Weiss, Mannheim; Hans Willing, Duerkheim; Erhard Seiler, Ludwigshafen, all of Fed. Rep. of Germany

[73] Assignee: BASF Aktiengesellschaft, Fed. Rep. of Germany

[21] Appl. No.: 107,905

[22] Filed: Dec. 28, 1979

[30] Foreign Application Priority Data

Jan. 18, 1979 [DE] Fed. Rep. of Germany ....... 2901776

[51] Int. Cl.³ ............................................... C08K 3/04
[52] U.S. Cl. ................................................ 260/42.46
[58] Field of Search ...................................... 260/42-46

[56] References Cited

U.S. PATENT DOCUMENTS 2,316,418  4/1943  Habgood ........................ 260/42.46

*Primary Examiner*—Carman J. Seccuro
*Attorney, Agent, or Firm*—Keil & Witherspoon

[57] ABSTRACT

A process for the preparation of finely divided polyolefin molding materials from 100 parts by weight of polyolefin and from 1 to 30 parts by weight of a conductive carbon black, with or without other additives, wherein the mixture of polyolefin powder and carbon black is compounded, in a first stage, until the crystallite melting point of the polyolefin is reached, and is then brought, in a second stage, to a temperature which is from 3° to 40° C. above the said crystallite melting point, after which the mixture is discharged from the mixer within from 0.5 to 30 seconds and is cooled within 120 seconds.

1 Claim, No Drawings

PREPARATION OF FINELY DIVIDED POLYOLEFIN MOLDING MATERIALS CONTAINING CONDUCTIVE CARBON BLACK, AND THEIR USE FOR THE PRODUCTION OF MOLDINGS

The present invention relates to a process for the preparation of finely divided polyolefin molding materials containing conductive carbon black. These molding materials comprise (a) 100 parts by weight of a finely divided partially crystalline polyolefin which has a mean particle diameter of from 10 to 5,000 μm and an intrinsic viscosity [η], measured in decalin at 130° C., of from 0.5 to 15 and (b) from 1 to 30 parts by weight of a conductive carbon black which has a mean particle diameter of from 10 to 50 nm, with or without (c) conventional amounts of other additives or auxiliaries.

The above types of polyolefin molding materials which contain carbon black and are devoid of a definite shape are materials which can be converted to shaped polyolefin articles by conventional methods such as injection molding or extrusion.

The incorporation of conductive carbon blacks into polyolefin materials is a well-established process for reducing the surface resistivity of moldings produced from the materials, and thereby virtually eliminating the danger of electrostatic charge accumulation. Such products are employed particularly where there is a danger of sparking due to an electrostatic charge, which sparking could ignite highly flammable materials, or cause them to explode. Hence the use of containers possessing antistatic properties is, for example, compulsory in explosion-proof areas.

In practice, conductive carbon black is introduced into the polymer by mixing it into the completely molten polymer under shearing conditions. This process may be carried out on the screw kneaders, extruders or internal mixers conventionally used for thermoplastic compounding. The process is, however, not free from problems such as those of accurate dosing of the conductive additive, which generally tends to raise dust, and, especially, the resulting very troublesome soiling of the machinery and of the operatives.

Incorporation of conductive carbon blacks into polyolefins by the conventional methods in every case substantially reduces the flow of the polyolefin, so that it is desirable to employ as little of the conductive carbon black as possible.

Since high shearing forces necessarily occur during the conventional incorporation of additives into molten polyolefins, the process is furthermore unsuitable for polyolefins which, because of their high molecular weight, suffer irreversible damage by shearing forces.

It is an object of the present invention to provide a cheap, clean and precise process, employing simple apparatus, for introducing conductive carbon black into polyolefin molding materials, which avoids the disadvantages of the prior art and gives filled molding materials which can easily be converted to high quality homogeneous moldings.

We have found that this object is achieved, according to the invention, if the components (a) finely divided, partially crystalline polyolefin and (b) conductive carbon black, with or without (c) other additives and auxiliaries, are mixed, in a first process stage (I), in a mixer, with or without supply or removal of heat, during which first stage (I), in a first sub-stage (I.1) the mixture is brought, at a mixing intensity of from 100 to 500 W/l of useful capacity, and within a period of from 2 to 50 minutes, from ambient temperature, which is below the crystallite melting point of the polyolefin (a) and is, in particular, room temperature, to the crystallite melting point of the polyolefin (a), and is immediately thereafter, in the course of a second substage (I.2), subjected to a mixing intensity which is from 0.3 to 0.8 times as great as the mixing intensity in the first sub-stage (I.1) and is brought, within a period of from 0.2 to 20 minutes, from the crystallite melting point of the polyolefin (a) to a temperature which is from 3° to 40° C. above this, and, if appropriate, is immediately thereafter, in a third substage (I.3), subjected to a mixing intensity which is from 0.5 to 1.0 times as great as the mixing intensity in the second sub-stage (I.2) and kept for a period of from 0.2 to 10 minutes at the temperature reached in sub-stage (I.2), and immediately thereafter, in a second stage (II), the mixture is discharged from the mixer within a period of from 0.5 to 30 seconds and is brought, within 120 seconds, to a temperature below the crystallite melting point of the polyolefin (a).

For the purposes of the invention, finely divided partially crystalline polyolefins (a) are those which have a particle diameter of from 10 to 5,000, preferably from 100 to 2,000, μm and have an intrinsic viscosity (measured by the method of DIN No. 53,728 in decalin at 130° C.) of from 0.5 to 15, preferably from 1 to 10. The polyolefins are preferably high density polyethylene (0.93–0.97 g/cm$^3$) and polypropylene, especially a polypropylene produced by the gas phase process as described, for example, in German Published Application DAS No. 1,217,071, as well as copolymers of ethylene and propylene provided they are partially crystalline, and corresponding polymers containing up to 5 percent by weight of grafted-on acrylic acid.

For the purposes of the invention, polyolefins are regarded as partially crystalline if they exhibit one or more sharp melting peaks on DSC analysis.

The conductive carbon black (b) should have a mean particle diameter of from 10 to 50, preferably from 13 to 40, nm. For the purposes of the invention, a conductive carbon black is a carbon black which in addition to conforming to the stated particle size range has a DBP adsorption of from 100 to 500 ml of dibutyl phthalate per 100 g of carbon black, when measured according to ASTM D 2414-T, and a surface area of from 50 to 1,200 m$^2$/g when measured by the BET method, using N$_2$ (J. Amer. Chem. Soc. 60 (1938), 309).

Examples of suitable auxiliaries and additives (c) are stabilizers, processing aids, eg. lubricants and mold release agents, adhesion promoters, compatibility promoters and blowing agents.

The molding materials can be prepared in a mixer in which the mixing vanes are located at right angles to the mixer axis; such mixers are described, for example, in German Published Applications DAS No. 1,054,073 and DAS No. 1,454,368. They have hitherto been used in the main for compounding non-crystalline thermoplastics having a broad softening range, eg. PVC and ABS. However, they can also be used for agglomerating finely divided polyolefins which have poor flow and a broad particle size distribution, resulting in a narrower and coarser particle size spectrum and a higher bulk density, so that the processing characteristics can thereby be improved. Further, it is known that the agglomeration of plastic particles can also be carried out in the presence of additives. German Laid-Open Application DOS No. 2,302,370 discloses that on compounding polyolefin powders in high-speed mixers the maximum temperature should be from 2° to 13° C. below the melting range of the polyolefin, if agglomeration and lump formation are to be avoided.

We have found, surprisingly, that using the process according to the invention it is possible also to work above the crystallite melting point of the particular polyolefin without causing substantial agglomeration, let alone lump formation, and that by working at such temperatures it is possible to bond conductive carbon black completely and irreversibly to the polyolefin component. The process yields finely divided, free-flowing molding materials which have a similar particle size distribution to that of the polymer employed, contain the carbon black (b) in a completely bonded form and can easily be converted to moldings, ie. exhibit good flow during such conversion.

In the process according to the invention, in a first sub-stage (I.1), the mixture of (a) and (b), with or without (c), is subjected to a mixing intensity of from 100 to 500, preferably from 200 to 400, W/l of useful capacity and brought, within a period of from 2 to 50, preferably from 5 to 20, minutes, from ambient temperature, which is usually room temperature, to the crystallite melting point of the polyolefin; thereafter, in the course of a second sub-stage (I.2), the mixture is subjected to a mixing intensity which is from 0.3 to 0.8, preferably from 0.4 to 0.7, times as great as the mixing intensity in (I.1) and is brought, within a period of from 0.1 to 20, preferably from 0.5 to 10, minutes, from the crystallite melting point of the polyolefin to a temperature which is from 3° to 40° C., preferably from 5° to 30° C., above the latter. The mixing intensity in W/l of useful capacity is defined as the energy uptake in Watt per liter of the volume which the components (a) and (b), with or without (c), occupy in the mixer.

The above sub-stages may be followed by a third sub-stage (I.3), where the mixing intensity is from 0.5 to 1.0, preferably from 0.5 to 0.8, times as great as the mixing intensity in (I.2) and the mixture is kept, for a period of from 0.2 to 10 minutes, preferably from 0.2 to 5 minutes, at the temperature reached in sub-stage (1.2).

Thereafter, in a second stage (II), the product is discharged from the mixer within a period of from 0.5 to 30, preferably from 0.5 to 10, seconds and is cooled to below the polymer melting point. However, it is also possible directly to process the product further whilst it is plastic, by means of suitable apparatus, without the additional cooling.

The process described requires much simpler apparatus and much less energy than, for example, compounding in an extruder. Furthermore it allows the conductive carbon black and any additives to be introduced simply, cleanly and precisely, without a complicated dosing technique and without raising dust.

The process has the further advantage that conductive carbon black can be introduced into thermoplastics which are otherwise difficult to process, eg. ultra-high molecular weight polyethylene, without damaging the polymer. The amounts of conductive carbon black required to achieve a permanently antistatic character are less than using the conventional method. Furthermore, for a comparable content of conductive carbon black, the product obtained by the process according to the invention also exhibits substantially more advantageous flow characteristics than does a product obtained by conventional melt mixing.

The finely divided polyolefin molding materials containing conductive carbon black may be used for the manufacture of moldings by the conventional injection molding, extrusion and blow-molding processes.

The Examples which follow illustrate the above process.

EXAMPLE 1

The starting material is a mixture of (a) 25 kg (corresponding to 100 parts by weight) of a finely divided polyethylene which has a particle diameter of from 250 to 2,000 $\mu$m and a mean particle diameter of 800 $\mu$m, and possesses an intrinsic viscosity of 4.8, and (b) 1.6 kg (corresponding to 6.4 parts by weight) of a conductive carbon black of the type of Ketjen-BLACK EC 10 from AKZO, Netherlands. The above mixture is brought (I) in a first stage, in a mixer of 100 l useful capacity, without external supply or removal of heat (I.1) in a first sub-stage, at a mixing intensity of 230 W/l of useful capacity, and within a period of 10.5 minutes, from ambient temperatures (=room temperature) to the crystallite melting point of the polyethylene (a), namely 138° C.; immediately thereafter (I.2), in the course of a further sub-stage, the mixture is brought, at a mixing intensity which on average is 0.52 times as great as the mixing intensity in the first sub-stage (I.1), and within a period of 4 minutes, from the crystallite melting point of the polyethylene (a) to a temperature which is 32° C. above this, namely 170° C.; immediately thereafter (II), in a second stage, the mixture is discharged from the mixer within a period of 5 seconds and is brought, within a period of 35 seconds, to a temperature, namely 80° C., which is below the crystallite melting point of the polyethylene (a).

EXAMPLE 2

25 kg (corresponding to 100 parts by weight) of a finely divided polyethylene having the same characteristics as in Example 1 and 1.6 kg (corresponding to 6.4 parts by weight) of Ketjen-Black EC 10 were continuously but separately fed into a type ZSK twin-screw kneader from Werner and Pfleiderer and the gently molten polyethylene and conductive carbon black were mixed at about 250° C. The homogeneous mixture was discharged as strands which were cooled and granulated.

The products obtained in Examples 1 and 2 were examined in respect of the melt index (column 1) and the processability (column 2) on an extruder (screw diameter 40 mm, length 18 D, with grooved intake zone) fitted with a KAUTEX V 8 blow-molding unit, on which 100 ml bottles were produced under standard conditions (material temperature 220° C., blow-head without accumulator). 100 ml bottles were additionally produced on the same machine under modified conditions (240° C. material temperature, and using an accumulator head) and the surface resistance (column 3) in the area of the cylindrical side wall of these bottles was determined by the method of DIN No. 53,482. The results are summarized in the Table.

TABLE

| Molding material from: | Melt index (21.6 kg/190° C.) g.$10^{-1}$ min | Processing | Surface resistivity Ohm |
|---|---|---|---|
| Example 1 | 0.95 | satisfactory moldings under standard conditions | $3 \times 10^7$ |

TABLE-continued

| Molding material from: | Melt index (21.6 kg/190° C.) g.10$^{-1}$ min | Processing | Surface resistivity Ohm |
|---|---|---|---|
| Example 2 (Comparative Example) | 0.50 | 220° C. material temperature, without accumulator head) moldings cannot be produced under standard conditions (see above) | 10$^{12}$ |

As may be seen from the Table, the product obtained by the process according to the invention (Example 1), when compared to a product (Example 2) obtained by the conventional technology, shows better flow, substantially better processability and lower surface resistivity, indicating a good antistatic effect.

We claim:

1. A process for the preparation of finely divided polyolefin molding materials which contain conductive carbon black and comprise
   (a) 100 parts by weight of a finely divided partially crystalline polyolefin which has a mean particle diameter of from 10 to 5,000 μm and an intrinsic viscosity [η], measured in decalin at 130° C., of from 0.5 to 15, and
   (b) from 1 to 30 parts by weight of a conductive carbon black which has a mean particle diameter of from 10 to 50 nm,
   (c) with or without conventional amounts of other additives or auxiliaries, wherein components (a) and (b), with or without (c), are mixed, in a first stage (I), in a mixer, with or without supply or removal of heat, during which first stage (I), in a first sub-stage (I.1) the mixture is brought, at a mixing intensity of from 100 to 500 W/l of useful capacity, and within a period of from 2 to 50 minutes, from ambient temperature, which is below the crystallite melting point of the polyolefin (a) and is, in particular, room temperature, to the crystallite melting point of the polyolefin (a), and is immediately thereafter, in the course of a second sub-stage (I.2), subjected to a mixing intensity which is from 0.3 to 0.8 times as great as the mixing intensity in the first sub-stage (I.1) and is brought, within a period of from 0.2 to 20 minutes, from the crystallite melting point of the polyolefin (a) to a temperature which is from 3° to 40° C. above this, and, if appropriate, is immediately thereafter, in a third sub-stage (I.3), subjected to a mixing intensity which is from 0.5 to 1.0 times as great as the mixing intensity in the second sub-stage (I.2) and kept for a period of from 0.2 to 10 minutes at the temperature reached in sub-stage (I.2), and immediately thereafter, in a second stage (II), the mixture is discharged from the mixer within a period of from 0.5 to 30 seconds and is brought, within 120 seconds, to a temperature below the crystallite melting point of the polyolefin (a).

* * * * *